United States Patent
Lee et al.

[19]

[11] Patent Number: 6,068,246
[45] Date of Patent: May 30, 2000

[54] SLIM PROFILE HYDRAULIC ENGINE MOUNT

[75] Inventors: Chiung Alex Lee, Centerville; Richard Edward Longhouse, Dayton; Jay Michael Shores, Miamisburg; Daniel Edward Ferris, II, Cincinnati; Mark Wayne Long, Bellbrook, all of Ohio

[73] Assignee: General Motors Corporation, Detroit, Mich.

[21] Appl. No.: 09/067,415

[22] Filed: Apr. 28, 1998

[51] Int. Cl.⁷ ........................................ F16F 5/00
[52] U.S. Cl. ........................................ 267/140.11
[58] Field of Search .................. 267/140.13, 140.14, 267/140.11, 217, 219, 35, 64.19, 64.23, 64.27; 248/550, 566, 636

[56] References Cited

U.S. PATENT DOCUMENTS

| | | |
|---|---|---|
| 4,648,576 | 3/1987 | Matsui . |
| 4,730,584 | 3/1988 | Jordens et al. ............... 123/192 R |
| 4,773,634 | 9/1988 | Hamaekers . |
| 4,805,884 | 2/1989 | Jordens et al. ............... 267/140.14 |
| 4,834,348 | 5/1989 | Jordens et al. ............... 267/140.13 |
| 4,886,253 | 12/1989 | Lun . |
| 4,997,170 | 3/1991 | Roos et al. . |
| 5,927,698 | 7/1999 | Miyoshi et al. ............... 267/140.13 |

FOREIGN PATENT DOCUMENTS 2906282  8/1980  Germany .

*Primary Examiner*—Christopher P. Schwartz
*Assistant Examiner*—Melanie Talavera
*Attorney, Agent, or Firm*—Robert M. Sigler

[57] ABSTRACT

A hydraulic mount includes a mounting plate and a wall, with a working chamber defined between the mounting plate and the wall. The mounting plate and the wall are separated by a relatively thick elastomeric element so that the size of the working chamber varies as the elastomeric element is compressed and expanded by operation of the mounting plate and the wall moving closer together and farther apart. A reservoir is defined substantially by the elastomeric element in combination with a relatively flexible diaphragm that extends between the mounting plate and the wall so that the reservoir is generally annular in shape and is positioned around the working chamber. The elastomeric element serves as a separation wall between the working chamber and the reservoir. The mount includes a fluid track extending through the wall and opening between the working chamber and the reservoir, with a fluid contained in the working chamber, the reservoir and the fluid track, so that the mount is tunable by varying the size of the fluid track.

7 Claims, 2 Drawing Sheets

SLIM PROFILE HYDRAULIC ENGINE MOUNT

TECHNICAL FIELD

The present invention relates to hydraulic powertrain mounts and more particularly, to a hydraulic engine mount with a compact working chamber and reservoir chamber arrangement that results in a reduced overall mount height.

BACKGROUND OF THE INVENTION

Conventional powertrain mounts exist in many varieties and generally operate to provide engine isolation while concurrently controlling engine motion. One common type of mount is the elastomeric mount. The typical damping versus frequency performance curve for an elastomeric mount is relatively constant. The plain elastomeric mount provides a fairly constant damping rate across the range of frequencies that it is typically exposed to in a common application. The level of damping provided is typically increased or decreased by selecting an elastomeric material having different properties and physical dimensions. Another general characteristic of a typical plain elastomeric mount, is that it provides a relatively uniform damping rate regardless of vibrational input amplitude, or one that decreases slightly with amplitude. It has been recognized as desirable to provide a mount that exhibits relatively high damping responses at low frequencies and relatively low damping responses at high frequencies. It has also been recognized that a desirable operating characteristic of a mount is to have a high damping coefficient for relatively high amplitude inputs and a relatively low amplitude coefficient for lower amplitude inputs. In part, to provide these desirable operating characteristics the hydraulic mount was developed.

The typical hydraulic mount includes a pumping chamber surrounded by relatively thick elastomeric walls with an orifice track opening to the chamber and extending to a reservoir that is typically surrounded by a flexible rubber diaphragm. The reservoir is typically located on the opposite side of a partition from the pumping chamber. During compression operation, fluid is pressurized in the pumping chamber and is caused to flow through the orifice track to the reservoir. During rebound operation, fluid is drawn back to the pumping chamber from the reservoir. The geometry of the pumping chamber, orifice track and reservoir are tuned so that the fluid in the orifice track resonates at certain frequencies. This is used to provide a peak damping effect at a selected frequency to reduce vehicle harshness from road induced vibrations. In comparing the response achieved by the plain elastomeric mount to that achieved by the hydraulic mount, it is known that a hydraulic mount can be utilized to significantly reduce wheel hop induced vibrations, but can also result in an overall response that has the undesirable consequence of a slightly harsher ride characteristic.

Generally, hydraulic mounts are viewed as preferable in many applications. One hindrance in applying the hydraulic mount to certain vehicles is packaging, which is a consequence of the space requirements needed for the pumping chamber, reservoir and orifice track arrangement. Accordingly, it would be preferable if the hydraulic mount could be applied to a wider range of applications including those where packaging space is at a premium. Further, it would be preferable if the hydraulic engine mount could be configured in a manner that results in optimal damping and ride characteristics in the 5–8 Hz vibration range.

A known manner of achieving additional incremental increases in the performance characteristics of hydraulic mounts at selected frequency ranges, is to add electronic control to the dynamic characteristics of the mount to provide a preprogrammed active ability to change the response of the mount to optimize damping of the encountered vibrations. In a known type of electronically controlled mount, a solenoid actuator is provided to vary an orifice, effecting fluid flow control between the pumping chamber and reservoir of the mount. While this solution to the aforementioned drawbacks is relatively successful, it tends to be rather costly and typically requires a mount of relatively large size. This leads to significant restrictions in the number of applications within which the controlled mount can be utilized.

SUMMARY OF THE INVENTION

An aspect of the present invention is to provide a hydraulic engine mount with a working chamber and reservoir arrangement that results in a relatively slim profile, so that the mount can be utilized in applications where packaging space is limited. It is the further intent of this arrangement to achieve the goal of desensitizing the vehicle from road harshness in the 5–8 Hertz vibrational frequency range, while concurrently reducing vehicle vibration due to wheel hops in the 10–13 Hertz vibrational frequency range. The ultimate goal is to achieve performance improvements comparable to electronically controlled engine mounts in a competitive manner.

Initially, the invention reduces the overall height of a hydraulic engine mount to allow for application into smaller packaging spaces. The lateral space outside the main rubber element that surrounds the working chamber is utilized for the fluid reservoir. This eliminates any need to provide the reservoir space that is typically required underneath the fluid track defining structure. As a result, a smaller packaging space is required for expanded implementation and reduced costs. Optionally, the working chamber's elastomeric element and the diaphragm can be formed as one integral piece. Preferably, the volume in the reservoir is larger than the volume in the working chamber. For example, in one application the working chamber volume is 35.7 cm$^3$ and the reservoir volume is 46 cm$^3$. Preferably, the diaphragm used to surround the reservoir is extremely flexible so that the fluid pressure inside the reservoir is substantially equivalent to atmospheric pressure.

Advantageously, locating the reservoir around the working chamber results in a slim profile mount that reduces the overall height to an extent that a stacked type of arrangement for a dual operating mount device can be achieved. By stacking two slim profile hydraulic engine mounts, two independent working chambers and two independent fluid tracks can be incorporated into one device. Functionally, the stacked slim profile design operates with two individually tunable damping mechanisms. With two working chambers and two fluid tracks, this aspect of the invention provides an additional variable for increased tuning capabilities.

More specifically, the present invention provides a hydraulic mount with a working chamber that is defined within a relatively thick elastomeric element so that the size of the working chamber is variable as the elastomeric element is compressed and expanded. A reservoir is defined between the elastomeric element and a relatively flexible diaphragm so that the reservoir is generally annular in shape and is positioned around the working chamber so that the elastomeric elements serve as a wall for both the working chamber and the reservoir. A fluid track is provided in the hydraulic mount and extends between the working chamber and the reservoir, wherein fluid is contained in the working chamber, the reservoir and the fluid track. The diaphragm includes an outside surface that is exposed to atmospheric pressure so that the fluid in the reservoir is substantially at atmospheric pressure. The hydraulic mount is tunable by varying the size of the fluid track.

Optionally, this construction of a hydraulic mount allows for a stacked configuration wherein a second working chamber is defined within a relatively thick elastomeric element so that the size of the second working chamber varies as the elastomeric element is compressed and expanded. A second fluid track extends between the second working chamber and the reservoir, with fluid contained in the second fluid track and the second working chamber. The hydraulic mount is additionally tunable by varying the size of the second fluid track. This arrangement enables desensitizing the vehicle from road harshness in the 5–8 Hz vibrational input range, and enables reducing vehicle vibration due to wheel hops in the 10–13 Hz vibrational frequency range through selective tuning of the mount.

DESCRIPTION OF THE PREFERRED EMBODIMENT

Figure 1:
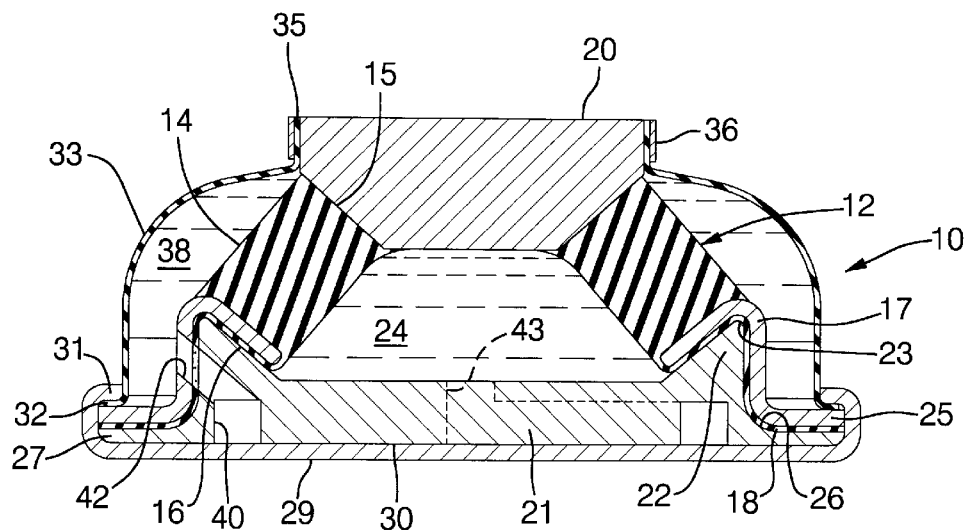
FIG. 1 is a cross-sectional illustration of a hydraulic mount according to the present invention.

Referring to the drawings, illustrated in FIG. 1 is a hydraulic powertrain mount 10. In general, the hydraulic mount 10 is intended to be employed in supporting vehicular powertrain components while reducing the transmission of vibrations between the powertrain and a vehicle body. Hydraulic mount 10 includes a rubber body designated as elastomeric element 12, that provides desirable performance characteristics selected for a given application wherein the elastomeric element 12 exhibits a certain resiliency and hardness. Generally, elastomeric element 12 is provided in an annular configuration, although the shape can be varied as desired and as dictated by the packaging requirements placed on the mount. Elastomeric element 12 includes a wall 14 that is set at an angle so that it diverges from end 15 to end 16 and is generally provided in the form of a truncated hollow cone. The elastomeric element 12 is molded or otherwise secured to a rigid metal support 17 includes a extension 18 that is adhered along the tortuous profile length of the rigid insert 17. A metal mounting plate 20 is adhered to the end 15 of elastomeric element 12 and a wall 21 is securely received adjacent end 16 of elastomeric element 12. Wall 21 includes a projecting ramped annular rib 22 that is received within annular recess 23 formed by rigid insert 17 and extension 18 facilitating assembly. A fluid filled working chamber 24 is defined between mounting plates 20 and wall 21, and within the elastomeric element 12.

For the present embodiment, rigid insert 17 is generally annular in shape and includes an radially outwardly extending arm 25, with the arm 25 and extension 18 of elastomeric element 12 closely seated upon step 26 of wall 21. Accordingly, the arm 25 and an extending ring 27 of wall 21 conveniently facilitate the securement of rigid insert 17 to wall 21 to hold the mount 10 together. To achieve this function, a metal support 29 encloses the side 30 of wall 21 and provides a clamping mechanism for fastening the rigid insert 17 to the wall 21. The crimped end 31 of support 29 also captures the end 32 of a relatively flexible elastomeric diaphragm 33 against the arm 25 of rigid insert 17. The diaphragm 33 includes another end 35 that is clamped to mounting plate 20 by a band 36.

Figure 3:
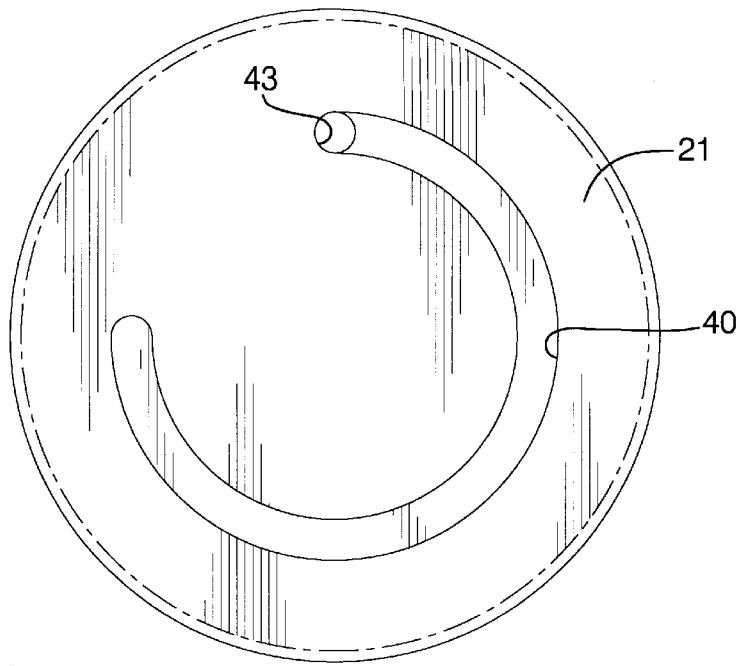
FIG. 3 is a detailed illustration showing the fluid track of the hydraulic mount of FIG. 1.

The diaphragm 33 encloses a substantially annular reservoir 38 that contains fluid and that is positioned around the elastomeric element 12. The working chamber 24 and reservoir 38 are interconnected by a fluid track 40 that extends through the wall 21 from reservoir port 42 to working chamber port 43. Referring to FIG. 3, an exposed view of wall 21 better illustrates fluid track 40. Fluid track 40 substantially comprises a semi-circular groove that is formed in wall 21 and is closed by support 29 as seen in FIG. 1. In the present embodiment the fluid track 40 extends a distance around the wall 21 that covers approximately 270 degrees. The length of the fluid track 40 is selected to provide operating characteristics that are determined by the application within which mount 10 will be utilized.

Referring again to FIG. 1, the mounting plate 20 and the support 29 serve as opposite mounting members for securing the hydraulic mount 10 between the body and powertrain components of the associated vehicle. In response to vibratory inputs, the elastomeric element 12 flexes and upon the compression of working chamber 24 fluid is forced to move through the fluid track 40 and into the reservoir 38 expanding the diaphragm 33. The characteristics of the elastomeric element 12 and the resistance of fluid movement through the fluid track 40 help to define the operational characteristics of the hydraulic mount 10. By changing the length and/or the cross-sectional area of the fluid track 40, the hydraulic mount 10 can be tuned for specific application uses. In general, the hydraulic mount 10 is tuned to reduce vehicle vibrations due to wheel hop inputs in the 10–13 Hertz vibrational frequency range. In the present embodiment the volume of the working chamber is set at approximately 35.7 cm$^3$ and the volume of the reservoir is set at approximately 46 cm$^3$. This advantageously provides sufficient reservoir space so that the fluid can substantially completely flow through the fluid track to the reservoir.

Figure 2:
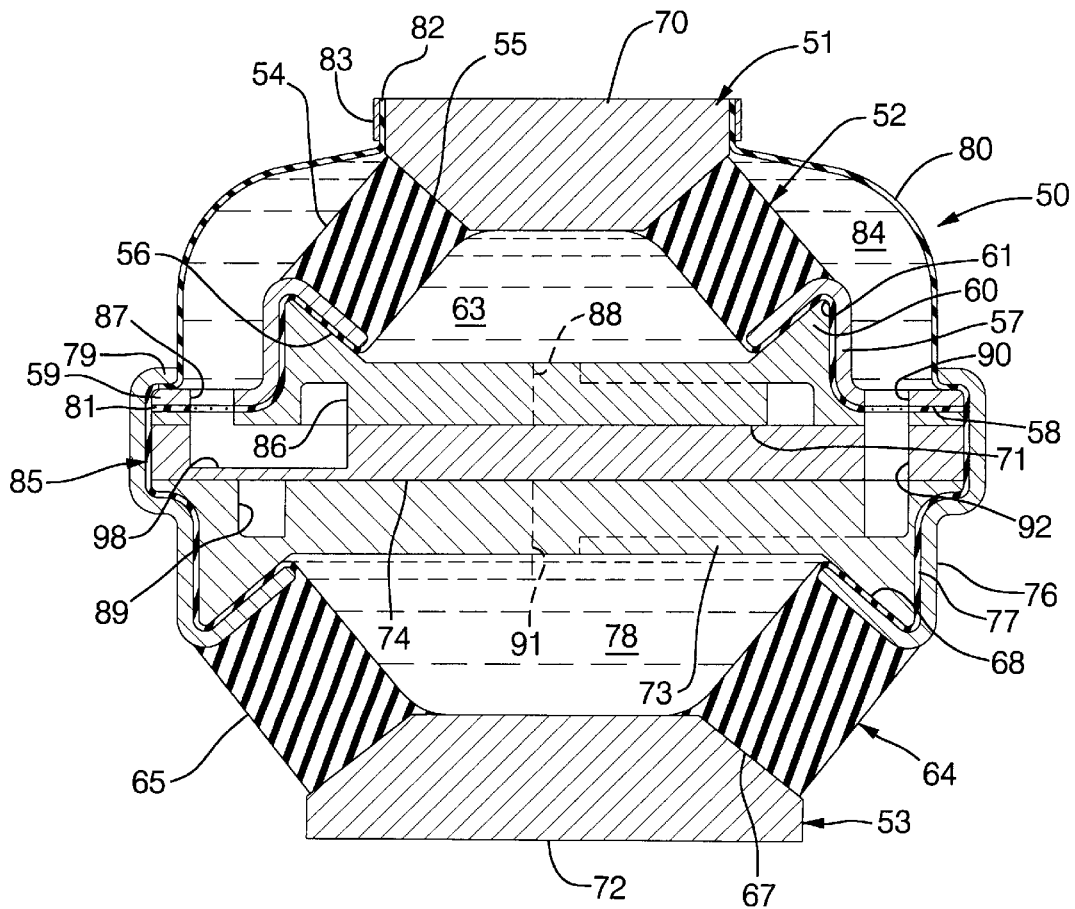
FIG. 2 is a cross-sectional illustration of a hydraulic mount according to the present invention.

The physical arrangement of the components of the present invention results in a relatively slim profile hydraulic mount 10 for application in smaller packaging spaces. In addition, this enables stacking mounts for increased tunability. Referring to FIG. 2, a stacked slim profile arrangement hydraulic mount 50 is illustrated. Generally, hydraulic mount 50 includes an upper mount assembly 51 and a lower mount assembly 53. The upper mount assembly 51 includes an elastomeric element 52 that is generally annular in shape, although the shape can be varied as desired and as dictated by the packaging requirements placed on the mount. Elastomeric element 52 includes a wall 54 that is set at an angle and diverges from end 55 to end 56 and is generally provided in the form of a truncated hollow cone. Elastomeric element 52 is bonded to a rigid metal support 57 and includes an extension 58 that follows the tortuous profile of the rigid support 57. The rigid support 57 extends to an arm 59 that extends radially outward. Mounting plate 70 is bonded to the end 55 of elastomeric element 52 and a plate 71 includes a ramped annular rib 60 that is received within an annular recess 61 that is formed by rigid support 57 and extension 58. A working chamber 63 is defined between the plates 70 and 71 and is surrounded by elastomeric element 52.

Lower mount assembly 53 includes an elastomeric element 64 with a wall 65 that is set at an angle so that it diverges from end 67 to end 68 and is generally provided in the form of a truncated hollow cone. Elastomeric element 64 is bonded to a rigid metal support 76 and includes an extension 77 that follows the shape of rigid support 76. The end 67 of elastomeric element 64 is bonded to mounting plate 72 with a working chamber 78 defined between the plate 72 and an additional plate 73. The working chamber exists within the confines of elastomeric element 64.

The upper mount assembly 51 and lower mount assembly 53 are secured together by rigid support 76 which includes a crimped end 79 that wraps around the arm 59 of rigid support 57. A diaphragm 80 includes a segment 81 that is secured between the crimped end 79 of rigid support 76 and the arm 59 and an end 82 that is secured between the plate 70 and ring 83 and is formed as part of elastomeric element 64. The diaphragm 80 encloses a reservoir 84 that is annular in shape and is positioned radially outside elastomeric element 52, which acts as a separation wall between the working chamber 63 and the reservoir 84.

At the juncture of upper mount assembly 51 and lower mount assembly 53, hydraulic mount 50 includes a wall 85 that comprises plate 71, plate 73 and a spacer 74. The reservoir 84 is open to the working chamber 63 through fluid track 86, which extends between reservoir port 87 and working chamber port 88. The fluid track 86 includes a segment 98 that extends through the spacer 74. The reservoir 84 is also open to working chamber 78 through fluid track 89, which extends between reservoir port 90 and working chamber port 91. The fluid track 89 includes a segment 92 that extends through the spacer 74.

The hydraulic mount 50 has two independent working chambers 63 and 78 and two independent fluid tracks 86 and 89 that communicate with a common reservoir 84. Functionally, the hydraulic mount 50 operates with two independently tunable damping mechanisms. With two working chambers and two fluid tracks, the hydraulic mount 50 provides an additional level of tuning capability over the conventional hydraulic mount. Hydraulic mount 50 mount is tunable to desensitize the associated vehicle from road harshness in 5–8 Hertz vibrational frequency range as well as to reduce the vehicle vibration effects produced due to wheel hops in the 10–13 Hertz vibrational frequency range.

The mounting plates 70 and 72 serve as mounting elements for the hydraulic mount 50. When inputs effect movement between the plates 70 and 72, the working chambers 63 and 78 are compressed forcing fluid through the fluid tracks 86 and 89 and into the reservoir 84 expanding the diaphragm 80. When the elastomeric elements 52 and 64 resiliently re-expand, the hydraulic mount 50 forces the plates 70 and 72 apart, and fluid is drawn back into the working chambers 63 and 78 through the fluid tracks 86 and 89 from the reservoir 84. By changing the size of the fluid tracks 86 and/or 89 the mount is tuned to effect desirable performance characteristics.

Figure 4:
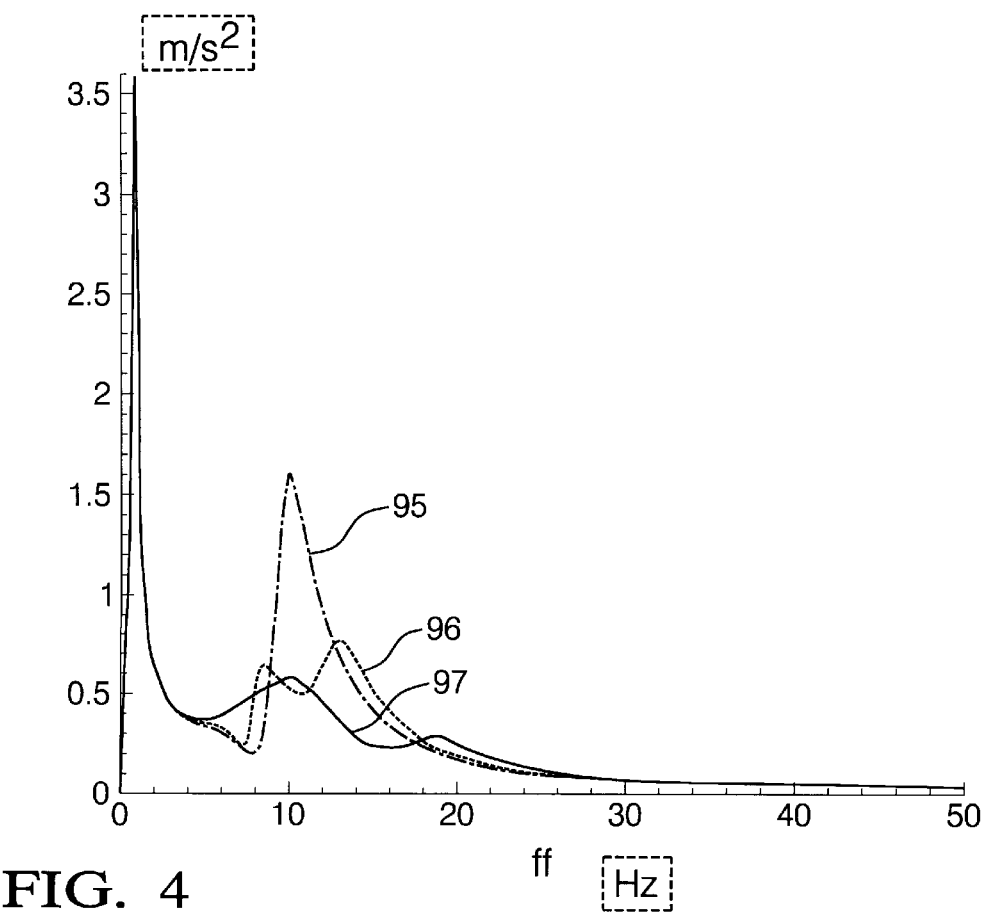
FIG. 4 is a graph illustrating the performance of various hydraulic mounts and shows vehicle body acceleration in millimeters/sec$^2$ versus vibrational input frequency in Hertz.

Referring to FIG. 4, a graph charts various performance curves that illustrate vehicle body acceleration in millimeters/sec$^2$ versus vibrational frequency in Hertz. Curve 95 illustrates the performance of a conventional plain elastomeric mount. This performance curve demonstrates a dip at approximately 8 Hertz and a very high peak at approximately 10 Hertz. The curve 96 illustrates the performance of hydraulic mount 10 which shows a significant improvement over the curve 95 in the 10–13 Hertz range with a slight increase in acceleration at the 6–8 Hertz range. Curve 97 shows the performance of the hydraulic mount 50, which significantly reduces the acceleration in the 6–8 Hertz range as compared to the curve 96. This is particularly desirable since the 6–8 Hertz range is generally the most sensitive to human detection. The peaks in curve 97 slightly above 8 Hertz, and at approximately 13 Hertz, are somewhat of a compromise when compared to the curve 96 but are not significant when the tunable target range of 6–8 Hertz is considered.

The present invention provides a slim profile hydraulic mount design that achieves desirable performance characteristics in both the 5–8 Hertz and 10–13 Hertz ranges. In addition, the slim profile design enables packaging a hydraulic mount within tighter space limitations and enables improved tunability arrangements and increases the applicability of hydraulic mounts.

What is claimed is:

1. A hydraulic mount comprising:

a first mounting plate and a wall, with a first working chamber defined between the first mounting plate and the wall, wherein the first mounting plate and the wall are separated by a relatively thick first elastomeric element so that the size of the first working chamber varies as the first elastomeric element is compressed and expanded by operation of the first mounting plate and the wall moving closer together and farther apart;

a reservoir defined substantially by the first elastomeric element in combination with a relatively flexible diaphragm so that the reservoir is positioned around the first working chamber so that the first elastomeric element serves as a separation wall between the first working chamber and the reservoir, wherein the diaphragm includes an outside surface that is exposed to atmospheric pressure;

a first fluid track extending through the wall and opening between the first working chamber and the reservoir wherein a fluid is contained in the first working chamber, the first reservoir and the first fluid track, wherein the hydraulic mount is tunable by varying the size of the first fluid track;

a second mounting plate positioned on an opposite side of the wall from the first mounting plate with a second working chamber defined between the wall and the second mounting plate wherein the wall and the second mounting plate are separated by a relatively thick second elastomeric element so that the size of the second working chamber varies as the second elastomeric element is compressed and expanded by operation of the second mounting plate and the wall moving closer together and farther apart; and a second fluid track extending through the wall and opening between the second working chamber and the reservoir wherein the fluid is also contained in the second working chamber and the second fluid track wherein the hydraulic mount is also tunable by varying the size of the second fluid track.

2. A hydraulic mount comprising: a first mounting plate and a wall, with a first working chamber defined between the first mounting plate and the wall, wherein the first mounting plate and the wall are separated by a relatively thick first elastomeric element so that the size of the first working chamber varies as the first elastomeric element is compressed and expanded by operation of the first mounting plate and the wall moving closer together and farther apart;

a reservoir defined substantially by the first elastomeric element in combination with a relatively flexible diaphragm so that the reservoir is positioned around the first working chamber so that the first elastomeric element serves as a separation wall between the first working chamber and the reservoir, wherein the diaphragm includes an outside surface that is exposed to atmospheric pressure;

a first fluid track extending through the wall and opening between the first working chamber and the reservoir wherein a fluid is contained in the first working chamber, the first reservoir and the first fluid track, wherein the hydraulic mount is tunable by varying the size of the first fluid track;

a rigid insert ring supporting the first elastomeric element wherein the insert ring includes a radially projecting arm and further comprising a support with a crimped end of the support capturing the diaphragm, the arm and the wall and securing the hydraulic mount together; and wherein the wall includes an annular rib that is received within an annular recess formed by the insert ring and by an extension of the first elastomeric element.

3. A hydraulic mount comprising:

a first mounting plate and a wall, with a first working chamber defined between the first mounting plate and the wall wherein the first mounting plate and the wall are separated by a relatively thick first elastomeric element so that the size of the first working chamber varies as the first elastomeric element is compressed and expanded by operation of the first mounting plate and the wall moving closer together and farther apart, and wherein the wall includes an annular rib and a radially extending ring;

a reservoir defined substantially by the first elastomeric element in combination with a relatively flexible diaphragm so that the reservoir is positioned around the first working chamber so that the first elastomeric element serves as a separation wall between the first working chamber and the reservoir, wherein the diaphragm includes an outside surface that is exposed to atmospheric pressure;

a first fluid track extending through the wall and opening between the first working chamber and the reservoir wherein a fluid is contained in the first working chamber, the reservoir and the first fluid track wherein the hydraulic mount is tunable by varying the size of the first fluid track; and a rigid insert ring supporting the elastomeric element wherein the insert ring includes a radially projecting arm and defines an annular recess wherein the radially projecting arm is received near the radially extending ring and wherein the annular rib is received within the annular recess.

4. A hydraulic mount according to claim 3 further comprising:

a second mounting plate positioned on an opposite side of the wall from the first mounting plate with a second working chamber defined between the wall and the second mounting plate wherein the wall and the second mounting plate are separated by a relatively thick second elastomeric element so that the size of the second working chamber varies as the second elastomeric element is compressed and expanded by operation of the second mounting plate and the wall moving closer together and farther apart; and a second fluid track extending through the wall and opening between the second working chamber and the reservoir wherein the fluid is also contained in the second working chamber and the second fluid track wherein the hydraulic mount is also tunable by varying the size of the second fluid track.

5. A hydraulic mount according to claim 4 wherein the second elastomeric element is supported by an insert that is crimped over the radially extending arm of the wall securing the hydraulic mount together.

6. A hydraulic mount comprising:

a mounting plate and a wall, with a working chamber defined between the mounting plate and the wall wherein the mounting plate and the wall are separated by a relatively thick elastomeric element so that the size of the working chamber varies as the elastomeric element is compressed and expanded by operation of the mounting plate and the wall moving closer together and farther apart, and wherein the wall includes a ramped annular rib and a radially extending ring;

a reservoir defined substantially by the elastomeric element in combination with a relatively flexible diaphragm that extends between the mounting plate and the wall so that the reservoir is generally annular in shape and is positioned around the working chamber so that the elastomeric element serves as a separation wall between the working chamber and the reservoir, wherein the diaphragm includes an outside surface that is exposed to atmospheric pressure;

a fluid track extending through the wall and opening between the working chamber and the reservoir wherein a fluid is contained in the working chamber, the reservoir and the fluid track wherein the hydraulic mount is tunable by varying the size of the fluid track; and a rigid insert ring supporting the elastomeric element wherein the insert ring includes a radially projecting arm and wherein the elastomeric element includes a relatively thin extension that follows the insert ring wherein the insert ring and extension define an annular recess wherein the radially projecting arm is received near the radially extending ring and wherein the ramped annular rib is received within the annular recess.

7. A hydraulic mount comprising:

a first mounting plate and a wall, with a first working chamber defined between the first mounting plate and the wall wherein the first mounting plate and the wall are separated by a relatively thick first elastomeric element so that the size of the first working chamber varies as the first elastomeric element is compressed and expanded by operation of the first mounting plate and the wall moving closer together and farther apart, and wherein the wall includes a ramped annular rib and a radially extending ring;

a reservoir defined substantially by the first elastomeric element in combination with a relatively flexible diaphragm so that the reservoir is generally annular in shape and is positioned around the first working chamber so that the first elastomeric element serves as a separation wall between the first working chamber and the reservoir, wherein the diaphragm includes an outside surface that is exposed to atmospheric pressure;

a first fluid track extending through the wall and opening between the first working chamber and the reservoir wherein a fluid is contained in the first working chamber, the reservoir and the first fluid track wherein the hydraulic mount is tunable by varying the size of the first fluid track to particularly attenuate vibrations of approximately ten to thirteen hertz;

a rigid insert ring supporting the first elastomeric element wherein the insert ring includes a radially projecting arm and wherein the first elastomeric element includes a relatively thin extension that follows the insert ring wherein the insert ring and extension define an annular recess wherein the radially projecting arm is received near the radially extending ring and wherein the ramped annular rib is received within the annular recess;

a second mounting plate positioned on an opposite side of the wall from the first mounting plate with a second working chamber defined between the wall and the second mounting plate wherein the wall and the second mounting plate are separated by a relatively thick second elastomeric element so that the size of the second working chamber varies as the second elastomeric element is compressed and expanded by operation of the second mounting plate and the wall moving closer together and farther apart; and a second fluid track extending through the wall and opening between the second working chamber and the reservoir wherein the fluid is also contained in the second working chamber and the second fluid track wherein the hydraulic mount is also tunable by varying the size of the second fluid track to particularly attenuate vibrations of approximately five to eight hertz.

* * * * *